Feb. 27, 1962 S. ZAVARELLA 3,022,621
BLADE FOR ROTARY CUTTER
Filed Aug. 19, 1959
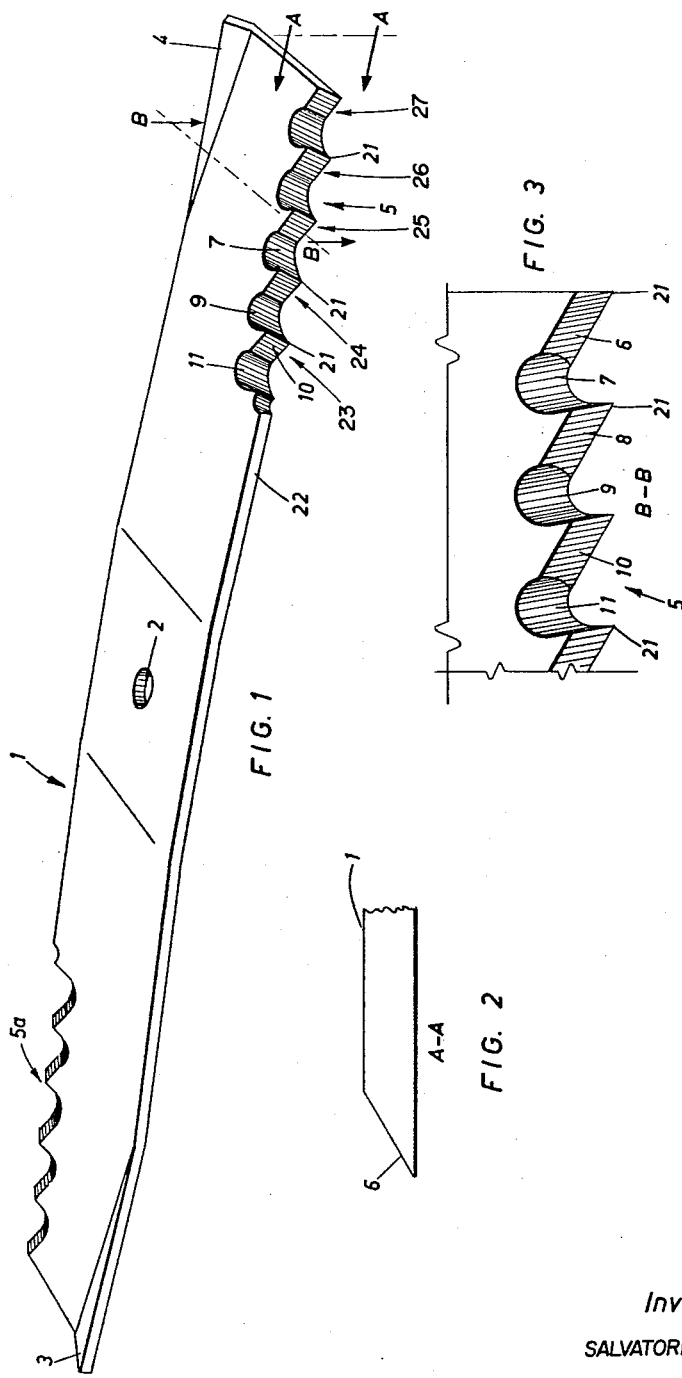
Inventor
SALVATORE ZAVARELLA
by: Cavanagh & Norman

United States Patent Office 3,022,621
Patented Feb. 27, 1962

3,022,621
BLADE FOR ROTARY CUTTER
Salvatore Zavarella, 51 Otonobee Ave., Willowdale,
Ontario, Canada
Filed Aug. 19, 1959, Ser. No. 834,734
4 Claims. (Cl. 56—295)

This invention relates to improvements in blades, particularly in the type used with rotary power mowers.

It is common in blades presently used with rotary power mowers to have straight cutting edges. However, the known cutting blades will not cut grass or hay, weeds or other vegetable growth, when the growth is wet because the wet cuttings clog and bind about the blade and reduce its efficiency. The growth must be fairly dry for known blades to continue to operate properly. Also it is known that in heavy growth the mower will stall if it is pushed through the grass or other vegetable growth at too rapid a speed. It is known in heavy growth that power mowers must be propelled through the growth slowly. Known power blades generally mash the grass rather than cut it due to the combined action of the heavy mass of the blade and the high angular velocity at which it rotates and strikes the stalks of the growing matter. It is the momentum of known blades which accomplishes the desired work. If the action were truly a cutting action, there would not be the necessity of providing a great mass to the blade as is presently done.

An object of the present invention is to construct a blade which truly cuts the growth rather than mashing it. One of the results of my invention is that a lighter less massive blade can be used.

The action of known blades is in fact more a flailing and mashing action than a cutting action. One of the objects of my invention is to construct a blade that imparts a scythe-like action to a rotary blade. It is the mashing action of the known mowers that causes the cuttings to clogg and stall the power source when the mower is propelled through heavy or wet growth. Moisture in the growing material provides a binder for the cuttings which causes clogging and binding within the mower housing.

I have found that both the clogging and the stalling of the mower can be overcome by designing the cutting edge of the blade to produce a true severing action when the blade is rotated.

It is known that cutting edges can be improved by scalloping the cutting edge or by providing a saw-tooth configuration to the cutting edge. I have produced a rotary blade which truly cuts by forming an indented cutting edge or edges on the side of the blade at an angle greater than 90° to the direction of rotation of the blade. With rotation of the blade the cutting edge is drawn across the stalks, with scythe-like action, thus truly severing the stalks in two rather than flailing mashing, or chopping them, as happens when the cutting edge is at an angle less than 90° to the direction of motion of the power blade. I have also found that the cutting action is improved by having a series of cutting edges on the blade rather than a single indented stepped edge or face. The series of indented edges imparts a serrated appearance to the blade. At the trailing end of each individual cutting edge I have provided a trough which acts as a guideway to clear the blade of the cut stalks of the grass or other vegetable matter. This cuttings accommodating trough produces the additional startling result that when the blade is used on an ordinary mower in cutting very heavy wet grass, the mower does not stall. The troughs prevent the wet grass from clinging to the blade and clogging the cutting edges.

In the drawings which illustrate embodiments of the invention

FIGURE 1 is a perspective view of my improved type of cutter blade,

FIGURE 2 is an end view looking along lines A—A of FIGURE 1,

FIGURE 3 is an enlarged elevation view of portion B—B of FIGURE 1.

The tool illustrated comprises a flat elongated blade 1 of steel with a hole positioned at 2 for attachment of the blade to the shaft of a rotary power means in the usual manner. The hole is equidistant from either end and from either side of the blade. Corners 3 and 4 of the blade are raised upwards as shown to direct cut growth away from the blade. The remainder of the edges of the blade are provided with cutting portions 5 and 5a. FIGURE 2 shows the taper of a typical cutting edge 6 in section. FIGURE 3 shows a typical section of pairs of cutting edges and guiding troughs 6 and 7, 8 and 9, 10 and 11.

The cutting portions 5 on the blade side 22 are in the form of indented segments 23, 24 etc. scalloped out of the blade sides. The segment consists of cutting edges 6, 8 and 10 and cuttings accommodating troughs 7, 9 and 11. The troughs are provided to guide the severed stalks away from the cutting edges and out of the path of the blade.

The cutting edge indentations are grouped in a straight line alignment across the cutting path. The cutting edge 6 is inclined in the plane of the blade at an angle to the side of the blade. The above angle is greater than the angle subtended by the line joining the centre of rotation of the blade 1 to the leading edge 22 at a leading point 21 where the cutting face 6 meets the leading edge 22 and by the line of the leading edge. Troughs 7, 9 and 11 are formed between cutting edges on the front side of the blade to guide the severed growth over the blade and away from the cutting edge to prevent clogging of the cutting edge. In a preferred embodiment of the invention the guideways are troughed into the upper flat side of the blade member 1 to improve the guiding action of the grooves and have a trough axis which is substantially parallel to the cutting path.

It is to be understood that the invention is not to be limited to the exact construction shown and described, but that modifications thereto may be made without departing from the scope of the invention, as defined in the appended claims.

What I claim is:

1. A lawn mower blade comprising: an elongated flat body of generally rectangular strip-like construction, embodying a hole disposed substantially centrally thereof for mounting said body for rotary motion thereof about said hole, and having a pair of diagonally opposed leading edges; a plurality of indented cutting edges formed in said leading edges adjacent either end of said body, and disposed in substantially parallel spaced apart arrangement at an angle greater than 90° to a line perpendicular to the longitudinal axis of said body; and a series of troughs formed in said body in substantially parallel arrangement between each said cutting edge and the next and adapted effectively to guide cuttings to a point remote therefrom, the longitudinal axis of each said trough being disposed in substantially perpendicular relationship with said longitudinal axis of said body.

2. A lawn mower blade comprising: an elongated flat body of generally rectangular strip-like construction, embodying a hole disposed substantially centrally thereof for mounting said body for rotary motion thereof about said hole, and having a pair of diagonally opposed leading edges; a plurality of indented cutting edges formed in said leading edges adjacent either end of said body, and disposed in substantially parallel spaced apart arrangement at an angle to the longitudinal axis of said body greater than the angle subtended by said axis and a line joining the centre of said body to the point of intersection of one of said leading edges with the end of said body adjacent thereto; and a series of troughs formed in said body in substantially parallel arrangement between each said cutting edge and the next and adapted effectively to guide cuttings to a point remote therefrom, the longitudinal axis of each said trough being disposed in substantially perpendicular relationship with said longitudinal axis of said body.

3. A lawn mower blade comprising: an elongated flat body of generally rectangular strip-like construction, embodying a hole disposed substantially centrally thereof for mounting said body for rotary motion thereof about said hole, and having a pair of diagonally opposed leading edges, the corners of said body remote from said leading edges being upwardly raised; a plurality of indented cutting edges formed in said leading edges adjacent either end of said body, and disposed in substantially parallel spaced apart arrangement at an angle greater than 90° to a line perpendicular to the longitudinal axis of said body; and a series of troughs formed in said body in substantially parallel arrangement between each said cutting edge and the next and adapted, in conjunction with said upwardly raised corners, effectively to guide cuttings to a point remote therefrom, the longitudinal axis of each said trough being disposed in substantially perpendicular relationship with said longitudinal axis of said body.

4. A lawn mower blade comprising: an elongated flat body of generally rectangular strip-like construction, embodying a hole disposed substantially centrally thereof for mounting said body for rotary motion thereof about said hole, and having a pair of diagonally opposed leading edges, the corners of said body remote from said leading edges being upwardly raised; a plurality of indented cutting edges formed in said leading edges adjacent either end of said body, and disposed in substantially parallel spaced apart arrangement at an angle to the longitudinal axis of said body greater than the angle subtended by said axis and a line joining the centre of said body to the point of intersection of one of said leading edges with the end of said body adjacent thereto; and a series of troughs formed in said body in substantially parallel arrangement between each said cutting edge and the next and adapted, in conjunction with said upwardly raised corners, effectively to guide cuttings to a point remote therefrom, the longitudinal axis of each said trough being disposed in substantially perpendicular relationship with said longitudinal axis of said body.

References Cited in the file of this patent
UNITED STATES PATENTS

| | | |
|---|---|---|
| 1,929,838 | Crane | Oct. 10, 1933 |
| 2,552,951 | Freeman | May 15, 1951 |
| 2,597,774 | Britten | May 20, 1952 |
| 2,814,924 | Group et al. | Dec. 3, 1957 |
| 2,869,311 | Beeston | Jan. 20, 1959 |

FOREIGN PATENTS

| | | |
|---|---|---|
| 397,806 | Great Britain | Aug. 31, 1933 |